United States Patent [19]

Nguyen et al.

[11] Patent Number: 5,694,109

[45] Date of Patent: Dec. 2, 1997

[54] TWO-WIRE DC COMMUNICATION SYSTEM AND TRANSCEIVER

[75] Inventors: Andrew M. Nguyen, Liverpool; Benjamin V. Morrow, West Monroe, both of N.Y.

[73] Assignee: International Controls and Measurement Corp., Cicero, N.Y.

[21] Appl. No.: 707,423

[22] Filed: Sep. 4, 1996

[51] Int. Cl.$^6$ .................................................. H04M 11/04
[52] U.S. Cl. ........................... 340/310.02; 340/310.01; 340/310.06; 340/538; 455/3.3; 236/51; 165/22
[58] Field of Search ................... 340/310.01, 310.02, 340/310.06, 538; 455/3.3; 236/51; 165/22

[56] References Cited

U.S. PATENT DOCUMENTS

| | | | |
|---|---|---|---|
| 4,806,905 | 2/1989 | McGowan, III et al. | 340/310.01 |
| 4,816,703 | 3/1989 | Sterling, Jr. et al. | 340/310.01 |
| 4,899,131 | 2/1990 | Wilk et al. | 340/310.01 |
| 5,003,457 | 3/1991 | Ikei et al. | 340/310.01 |
| 5,089,974 | 2/1992 | Demeyer et al. | 340/310.01 |
| 5,197,668 | 3/1993 | Ratz et al. | 165/22 |
| 5,451,923 | 9/1995 | Seberger et al. | 340/310.06 |
| 5,581,246 | 12/1996 | Yarberry et al. | 340/310.01 |

*Primary Examiner*—Thomas Mullen
*Assistant Examiner*—Nina Tong
*Attorney, Agent, or Firm*—Trapani & Molldrem

[57] ABSTRACT

Arrangement for dc signaling between a transmitter or transceiver over a single pair of conductors to another transceiver or receiver of similar design. The conductors carry a dc communications voltage at a level $V_{comm}$ (e.g., 24 to 35 volts dc) and power for the tranceivers, receivers and/or transmitters of the system. The transceiver comprises a microprocessor having a signal input terminal $V_{in}$, a signal output terminal $V_{out}$, a sensor input circuit coupled to a sensor transducer, e.g., a temperature sensor, and a control output circuit coupled to control an external device, e.g., a furnace relay. A voltage limiting circuit device coupled to the pair of conductors supplies the microprocessor with a supply voltage $V_{dd}$ at a predetermined level (e.g., 5 volts dc) less than the communications voltage level $V_{comm}$. A signal input/output circuit coupled to the pair of conductors and to the microprocessor signal input and output terminals applies incoming pulse signals from the conductors to the input terminal, and applies onto the dc conductors output pulse signals. The output signals have high and low values respectively at the dc communications voltage level $V_{comm}$ and a predetermined voltage level $V_{Z2}$ (e.g., 10 to 12 volts) between the communications voltage $V_{comm}$ and the supply voltage $V_{dd}$. The signal input/output circuit can comprise a zener and a transistor.

17 Claims, 4 Drawing Sheets

TWO-WIRE DC COMMUNICATION SYSTEM AND TRANSCEIVER

BACKGROUND OF THE INVENTION

The present invention relates to signaling, communications and telemetry systems, and is more particularly concerned with control communication circuitry, e.g., for furnace and HVAC controls, in which dc power and communication or signaling are carried over the same single pair of conductors. The invention is also concerned with a two-wire dc communication network in which a plurality of transmitters, receivers, or transceivers can be coupled onto the same two conductors. The invention is more especially concerned with a communications circuit that facilitates control of a multi-function heating, air conditioning, heat pump and ventilation system in as simple a manner as possible, with a minimum of difficulty in wiring, and with the ability to add on functions.

In a typical heating, ventilation, and air conditioning system (or HVAC system), 24-volt ac thermostat power is used to communicate between the thermostat unit in the living space or "comfort space" and the furnace, and between the thermostat unit and the air conditioning/heat pump indoor and outdoor units. The thermostat power is used to communicate a call for heat, a call for blower only, a call for cooling, a call for humidification, and/or a call for dehumidification. To communicate all these signals, a bundle of conductors connects the thermostat with the secondary of the thermostat transformer and also with the furnace controller board, the air conditioner/heat pump, and to any auxiliary units. These conductors are typically color coded, and an installer has to be extremely careful as to which color wires are connected to which equipment, or the HVAC system will not function properly. In some installations, the HVAC system can require twenty-four separate conductors that have to be connected to the thermostat unit. This can create an installer's nightmare, especially where HVAC equipment is being added after construction and is to be incorporated into an existing furnace system.

Modern furnaces, air conditioners, and heat pumps omen employ multiple speed blowers and multiple speed compressors to achieve maximum efficiency of operation and optimal comfort. However, each option, that is each call for low heat, high heat, low blower speed, high blower speed, high compressor speed, or low compressor speed, for example, requires a separate conductor to communicate with the 24-volt ac transformer power between the thermostat unit and the HVAC equipment.

It would also be advantageous in many installations to have additional features, such as additional thermostats in certain rooms, and damper controls to reconfigure air flow to occupied spaces and away from unoccupied spaces within a heated or air conditioned building. However, in a conventional system, each feature requires yet another separate conductor, thus further complicating the communications system that is already perplexing to the installer.

The purpose for conventional 24-volt ac transformer power signaling is to provide a simple, reliable connection between the thermostat unit and the HVAC system components, and at the same time to isolate the system from the 120 or 240-volt household power. Unfortunately, the only signaling approach available with ac thermostat power is simple on/off signaling. That is, a given conductor is switched on to signal a call for heating (or cooling), and is later switched off to indicate that the call for heating (or cooling) has been satisfied. The call for heating indicates that the thermostat temperature is below some pro-established setpoint, and satisfaction means only that the thermostat temperature has risen some amount over setpoint. For multiple speed operation, it is useful to communicate that the room temperature is near setpoint or far from setpoint, but it is impossible to signal this information without using an additional conductor for each condition.

OBJECTS AND SUMMARY OF THE INVENTION

It is an object of the present invention to provide an improved technique of signaling between stations, e.g., between a thermostatic control unit and HVAC equipment, which permits any number of multiple components to communicate with one another over a single pair of dc conductors.

It is a further object to provide a two-wire dc communications arrangement in which multiple transceivers, receivers and transmitters on the system receive dc power and also communicate with one another over the same pair of dc conductors.

It is another object of this invention to provide a two-conductor system that permits installation of additional equipment onto an existing HVAC system without having to add wires for each equipment feature, and which will reduce the complexity of installation.

It is a yet further object to provide transceiver circuits of simple straightforward design that can be used either as a main station or as a remote unit.

It is another related object to provide communications circuitry which will operate properly even if installed with crossed polarity of the two dc conductors.

According to an aspect of the present invention, a dc signaling transmitter or transceiver is provided to communicate over a single pair of conductors with another transceiver, or with a receiver of similar design. The conductors carry a dc communications voltage at a level $V_{comm}$ (e.g., 24 to 35 volts dc) and power for the tranceivers, receivers and/or transmitters of the system. The transceiver comprises a microprocessor having a signal input terminal $V_{in}$, a signal output terminal $V_{out}$, a sensor input circuit coupled to a sensor transducer, e.g., a temperature sensor, and a control output circuit coupled to control or drive an external device, e.g., a furnace relay. A voltage limiting circuit device has an input coupled to the pair of conductors to receive the dc communications voltage level $V_{comm}$ and an output coupled to the microprocessor to supply thereto a supply voltage $V_{dd}$ at a predetermined level (e.g., 5 volts dc) less than the communications voltage level $V_{comm}$. A signal input/output circuit is coupled to the pair of conductors and to the microprocessor signal input terminal and signal output terminal. This circuit applies incoming pulse signals from the conductors to the input terminal, and applies onto the dc conductors output pulse signals that have high and low values at the dc communications voltage level $V_{comm}$ and a predetermined voltage level $V_{z2}$ (e.g., 10 to 12 volts) that is between the communications voltage $V_{comm}$ and the supply voltage $V_{dd}$.

The signal input/output circuit preferably employs a constant voltage drop device (e.g., a zener diode) having a voltage drop establishing the voltage level $V_{z2}$ and controlled switching device, e.g., a transistor, coupled in series between said pair of conductors. A junction of the voltage drop device and the controlled switching device is coupled to the microprocessor signal input terminal $V_{in}$. A control terminal of the controlled switching device, e.g., the base or gate of the transistor, is coupled to the microprocessor signal output terminal $V_{out}$.

Normally, when the transceiver is idle and is awaiting incoming signals, the signal output terminal $V_{out}$ will be at ground or low level, and the transistor or other switching device will be cut off. Pulse signals from another station appear on the conductors as negative-going pulses, going from the normal dc level $V_{comm}$ to the dc level $V_{ZZ}$ (i.e., going from +24 volts to +10 volts, and back to +24 volts). This drives the microprocessor signal input terminal $V_{in}$, from high to low and back, and these pulses are processed in the microprocessor. The microprocessor is programmed to respond to certain predetermined pulse codes or patterns (and disregard others, which are intended for other receivers or transceivers). The presence of a predetermined pulse code can cause the microprocessor to actuate a relay, for example, to turn equipment on or off. The code can also indicate an error of fault condition, in which case the microprocessor can provide a fault or status indication, e.g., on an LCD display. This feature can facilitate repairs in the event of burner failure, blower failure, or the like.

The transceiver can also have a sensor, e.g., a thermal transducer, coupled to an input of the microprocessor. This enables the transceiver to signal a call for heat (or cooling) along the pair of dc conductors. In this case, if there is no incoming signal (i.e., the microprocessor signal input terminal $V_{in}$ is at a constant high level), the microprocessor is free to transmit. If, for example, there is a voltage on the transducer indicative of a temperature below some setpoint, then the microprocessor produces a predetermined code or pattern of pulses at its signal output terminal $V_{out}$. These output pulses drive the transistor or other switching device, and superimpose pulse signals on the dc conductors. These pulses are received by a second transceiver or receiver, of similar design, and the second transceiver actuates a furnace ignition sequence, for example.

The microprocessors for these transceiver units can be programmed suitably so that one transceiver is a master, and others are slave to it. The two wires can be extended without difficulty to additional equipment, such as for example a room air damper, or an additional room thermostat so comfort control can be transferred from one thermostat to the other at different times of day. Each transceiver (or receiver) can have multiple functional controls associated with it, and each transceiver (or transmitter) can have multiple transducers or sensors, with each condition being associated with a different predetermined pulse code or pattern.

Further, in an appropriate installation, a metal chassis, duct, or water pipe can be employed as a return dc conductor, so that only a single wire needs to be extended to each location. Also, a bridge rectifier can be included in the transceivers, so that transceivers can be connected to the dc conductors regardless of polarity, and will still function properly.

In this invention, the transducers or sensors that can be employed are not limited only to on-off devices, but can be any other means that effectively changes its impedance value (or other sensible level) in response to a stimulus.

In a preferred mode, the communications voltage $V_{comm}$ is provided from rectifier means coupled to the thermostat transformer secondary. Alternatively, low voltage dc power can be obtained from a dc power supply or from a battery.

The above and many other objects, features, and advantages of this invention will present themselves to persons skilled in the art from the ensuing detailed description of a preferred embodiment of the invention, which should be read in connection with the accompanying Drawing.

DETAILED DESCRIPTION OF THE PREFERRED EMBODIMENT

Figure 1:
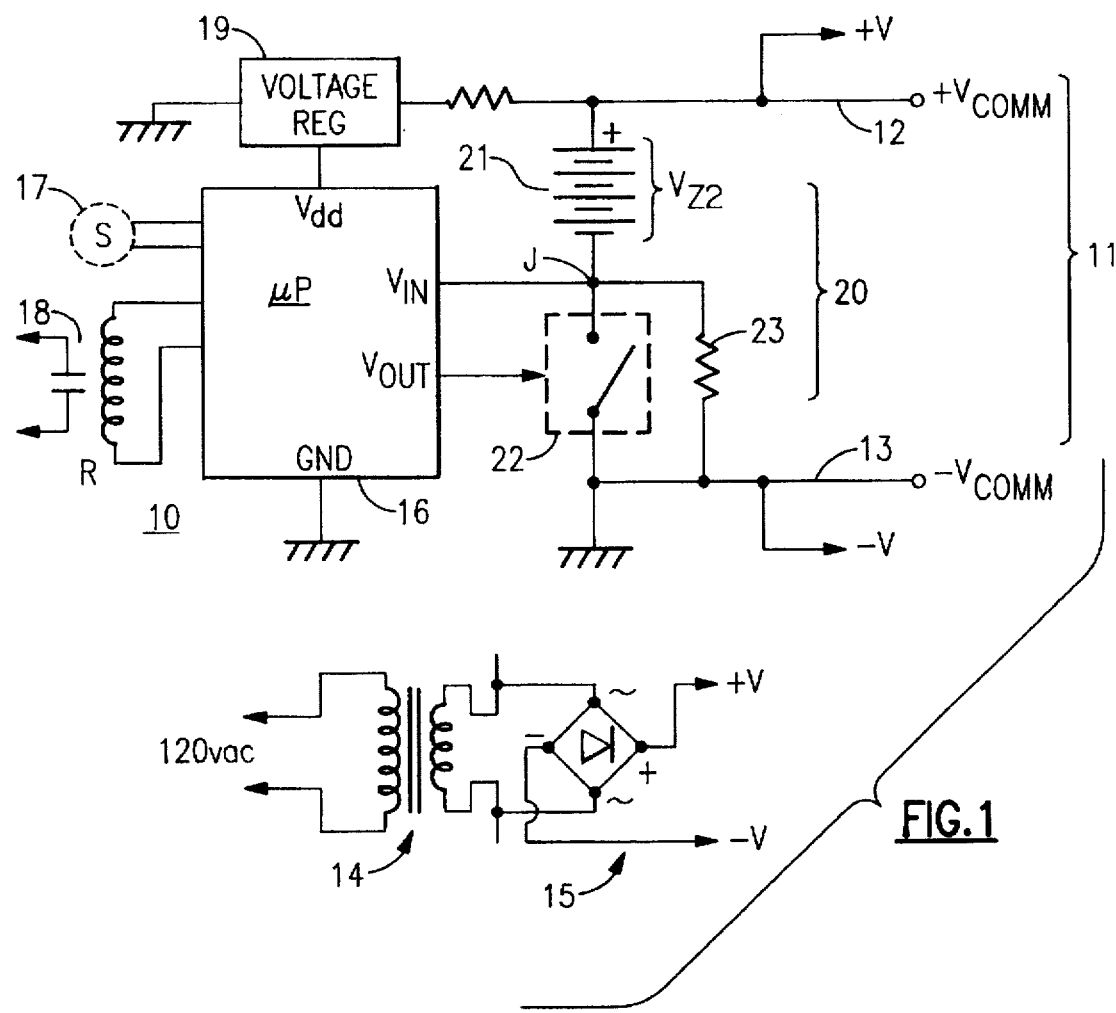
FIG. 1 is a schematic diagram of a microprocessor-based two-wire dc signaling transceiver according to an embodiment of the present invention.

With reference to the Drawing, FIG. 1 illustrates a two-wire dc transceiver arrangement 10 according to this invention, which is coupled to a conductor pair 11, the latter consisting of a positive conductor 12 and a negative conductor 13, with dc voltages $+V_{comm}$ and $-V_{comm}$, respectively. Favorably voltage $+V_{comm}$ can be about 24 to 35 vdc, and $-+V_{comm}$ can be considered ground or zero volts. In a furnace or air conditioning application, the voltage can be supplied from a thermostat transformer secondary 14 and rectified, for example in a full-wave bridge 15, supplying appropriate dc levels $+V$ and $-V$.

At the heart of the arrangement 10 is a microprocessor 16, provided as an integrated circuit and suitably programmed for sending and receiving pulse signals at respective terminals $V_{out}$ and $V_{in}$. A sensor or input transducer 17, e.g., a temperature sensing device such as a thermistor, is coupled to an input circuit of the microprocessor, and an output control device 18, such as a relay actuator coil, is coupled to an output circuit of the microprocessor 16. A voltage regulator device 19 is coupled to the positive conductor 12 and to ground, i.e., to the negative conductor 13, and has a controlled voltage terminal supplying an operating voltage $V_{dd}$, for example 5 volts, to a power input of the microprocessor.

A signal input/output circuit 20 is coupled to the pair 11 of dc conductors 12, 13 and to the microprocessor signal input terminal $V_{in}$ and signal output terminal $V_{out}$. This circuit 20 is formed of a constant voltage drop device 21 connected in series with a controlled switch 22 between the dc conductors 12 and 13. The device 21, which can be a zener diode, has a voltage drop $V_{ZZ}$ that is intermediate in value between the supply voltage $V_{dd}$ and the voltage $V_{comm}$. In one favorable example, the dc voltage $V_{comm}$ is 24 volts, the supply voltage $V_{dd}$ is 5 volts, and the voltage drop $V_{ZZ}$ is 10 volts. A junction J formed between the device 21 and the switch 22 is coupled to the microprocessor input terminal $V_{in}$, and the microprocessor output terminal $V_{out}$ is coupled to a control electrode for the controlled switch 22. A resistor 23 is shown here coupled in parallel with the switch 22, between the junction J and ground. This optional resistor 23 keeps the terminal $V_{in}$ from floating electrically, and quiets noise that may be present on the conductor pair 11.

Figure 2:
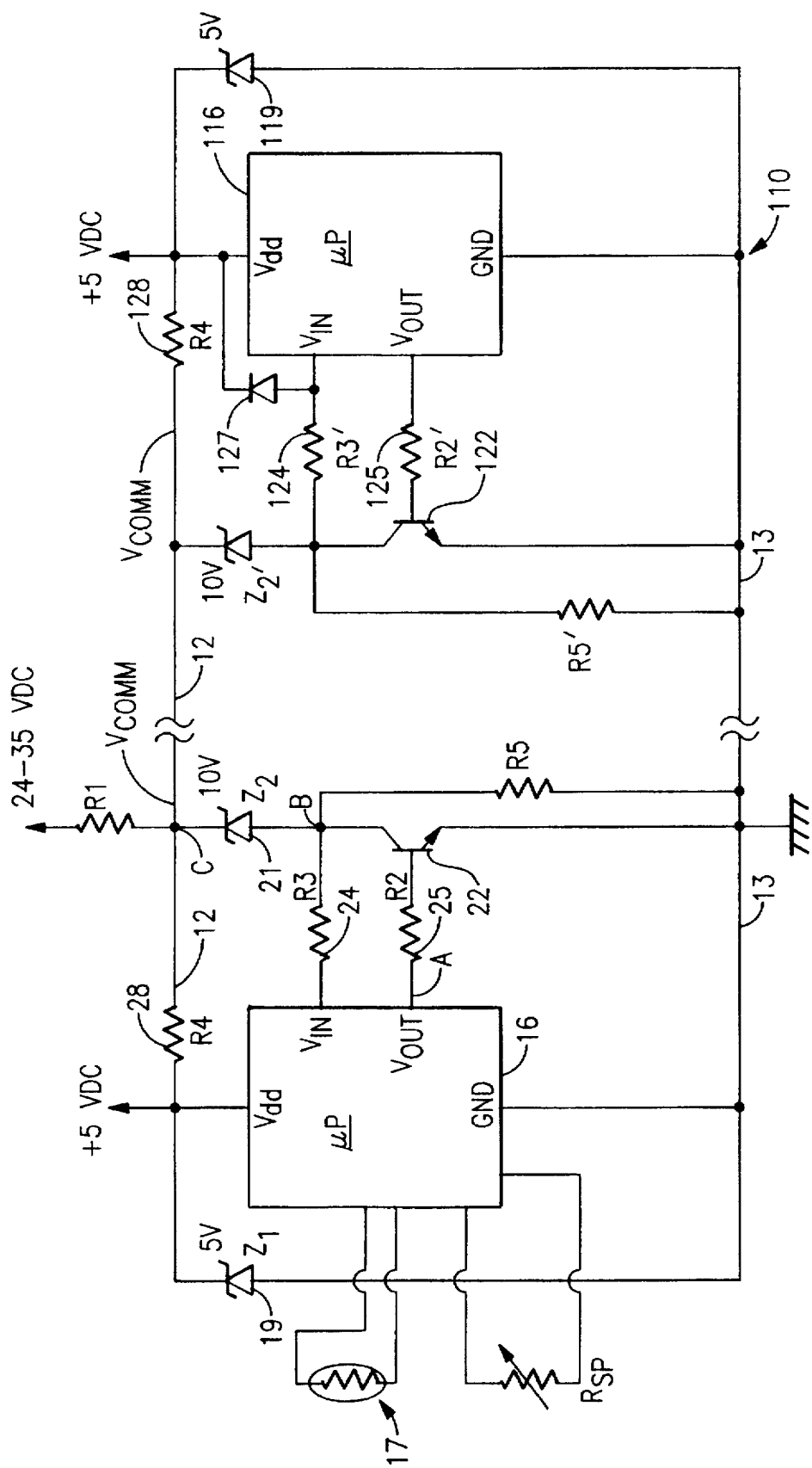
FIG. 2 is a more detailed schematic diagram of a communications arrangement according to an embodiment of the invention.

A more detailed circuit embodiment of this invention is shown in FIG. 2, in which elements that are also shown in FIG. 1 are identified with the same reference numbers, and a detailed description need not be repeated.

In this embodiment, a low-value resistor R1 is interposed between the dc voltage source and the conductor 12. This resistor R1 can have a value of 100 Ω. Here the circuit 20 is shown as being composed of a zener diode 21 coupled to the collector of an NPN junction transistor 22, whose emitter is grounded, and whose base is coupled via a resistor R2 to output terminal $V_{out}$. The microprocessor input terminal $V_{in}$ is coupled via a resistor R3 to the junction of the transistor 22 and the zener diode 21. The zener 21 has a zener voltage $V_{Z2}$ of 10 volts, and the resistors R2 and R3 can have respective values of 10K and 41K. Another resistor R4 disposed in advance of the microprocessor power terminal and a zener diode 19 comprise the voltage limiting device. Here the zener diode has a zener voltage $V_{Z1}$ of 5 volts and is coupled between the power and ground terminals of the microprocessor 16. The resistor R4 and the zener diode are a simple implementation of a voltage regulator and could be replaced with an LM 7805 or other type of regulator. The resistor R4 can have a resistance value of 2K. These specific values are not critical.

Shown here, the transducer 17 can be in the form of a thermistor TH and an associated variable resistance $R_{SP}$, the latter being adjustable to establish a thermostat set point. A comparator circuit within the microprocessor 16 compares the values of these two elements, and signals a call for heat (or a call for cooling) when the setpoint temperature is reached.

On the right-hand side of this drawing figure is a substantially identical transceiver 110, which is also connected to the dc conductors 12 and 13. The circuit elements are identified with similar reference numbers, but raised by 100, and the resistors also have similar reference characters, but with a prime added. In addition a protective diode 127 is here shown between the input terminal $V_{in}$ of the second microprocessor 116 and the power input $V_{dd}$. In practice, this diode 127 is provided internally within the microprocessor.

The transceiver 110 provides pulse signals that are carried on the conductors 12 and 13, and also receives pulse signals that are transmitted from the transceiver 10 or other similar arrangements that are also connected to the conductor pair 11.

Figure 3A:
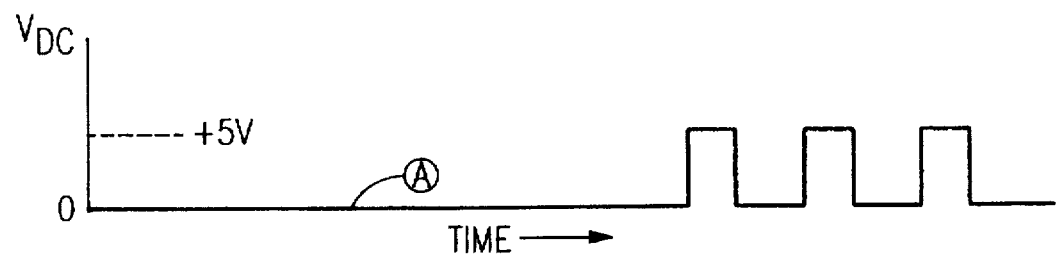
FIGS. 3A, 3B, and 3C are signal graphs for explaining the operation of this invention.
Figure 3B:
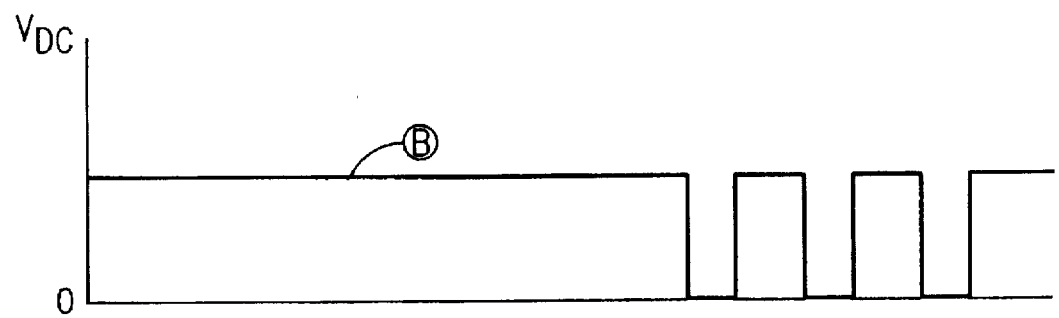
Figure 3C:
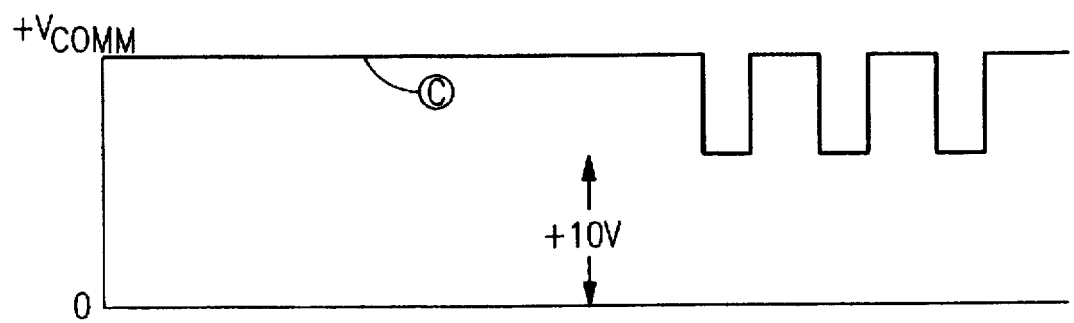

The operation of the transceiver arrangement 10 can be explained with reference to the signal diagrams of FIGS. 3A, 3B, and 3C.

If there is no signaling occurring on the conductor pair 11, the level on the conductor 12 will be $V_{comm}$, and a continuous high will appear at the microprocessor input $V_{in}$. The microprocessor 16 is then conditioned to transmit. When the transducer 17 indicates that a setpoint is reached, the microprocessor then produces a predetermined pattern of pulses at the output terminal $V_{out}$, i.e., at point A in FIG. 2. In this example, these appear as a series of three positive pulses, as shown in FIG. 3A. To communicate some other information, a different signal pattern would be used. The positive pulses gate the transistor 22 on, grounding the junction (here point B) between the collector of the transistor 22 and the anode of the zener diode 21. This point B is normally at about ten volts below the dc voltage $V_{comm}$, so inverted pulses, going down from ($V_{comm}-V_{Z2}$) to ground, appear at point B, as shown in FIG. 3B. Then, at the cathode of the zener diode 21, that is, at the positive conductor 12 (point C) the negative-going pulse signal appears as shown in FIG. 3C, going between a high of $V_{comm}$ and a low of $V_{Z2}$. These pulses travel along the conductors 12 and 13, and are received at the input terminal $V_{in}$ of the microprocessor 116 of the second transceiver arrangement 110.

The voltage appearing on the conductor 12 is always above the predetermined voltage level $V_{dd}$, and so the pulses do not reach the power inputs of the microprocessors and do not affect their operation.

At the microprocessor input $V_{in}$ of the microprocessor 116, here serving as a receiver, the input level in this example goes low three times in correspondence with this pulse pattern or code. Software programmed into the microprocessor 116 recognizes this pattern, and responds by turning on a switch, energizing a blower motor, closing a damper, or taking some other action in response to the appearance of this signal.

The transceiver arrangement 110 can serve as a transmitter, and the arrangement 10 can serve as a receiver, with the operation corresponding to that just described. Moreover, the transceiver 10 can have a plurality of associated transducers, and produce a corresponding plurality of pulse patterns or pulse codes to effect different respective operations. Likewise, each transceiver microprocessor can have a plurality of different associated control devices, e.g., relay drivers, and actuate each one in response to a different respective pulse code or pulse pattern.

Figure 4:
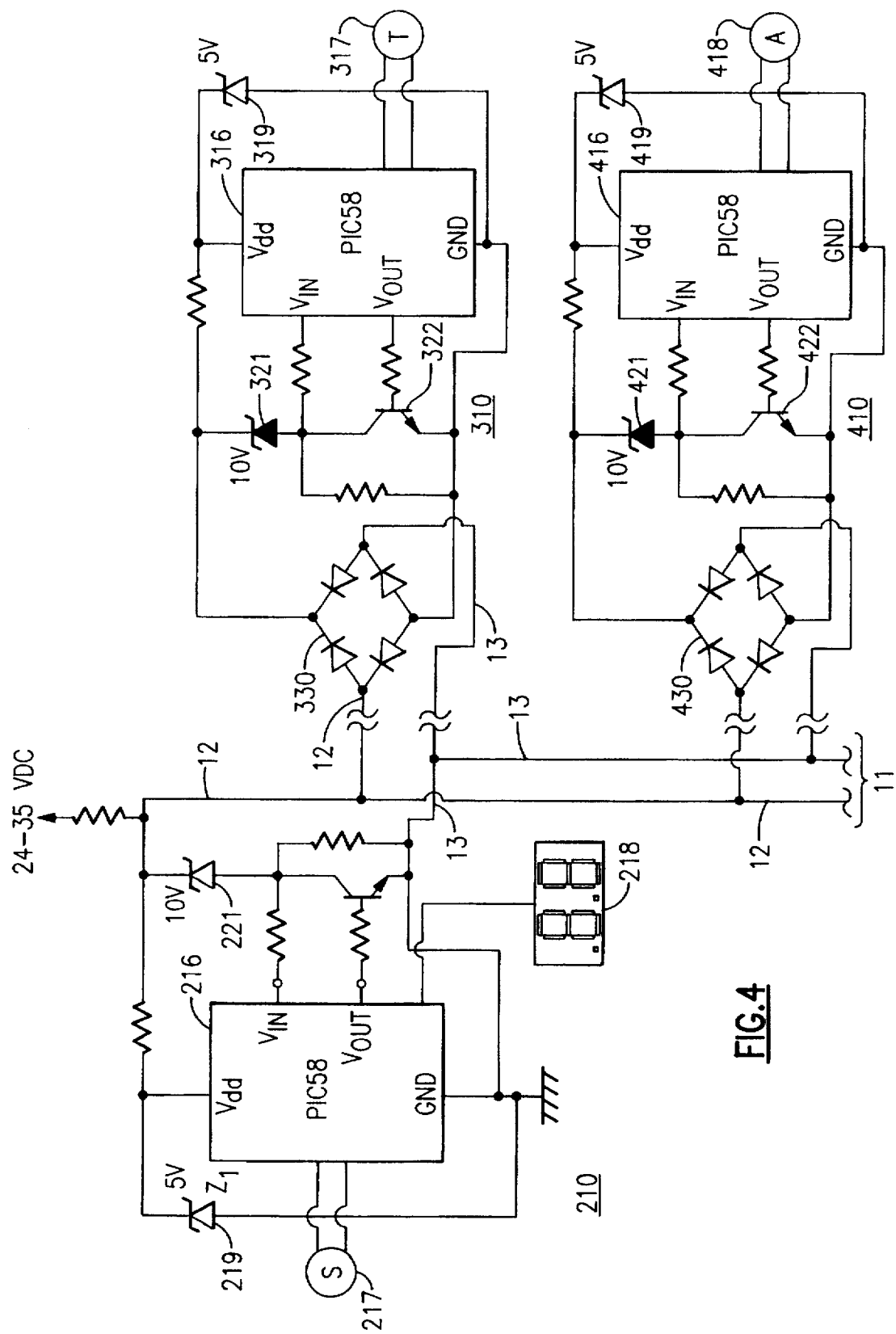
FIG. 4 is a schematic diagram of an arrangement according to related embodiment of this invention.

Another embodiment of this invention is shown in FIG. 4, employing first, second and third transceiver arrangements 210, 310, and 410, respectively, wherein the same elements as described above in reference to the first embodiment are identified with similar reference numbers, but raised by 200, 300, or 400, respectively. A detailed description of such elements will not be repeated.

Here the first transceiver 210 serves as a transmitter and has an associated sensor 217. An LCD display 218 can provide a numerical display in response to error codes that are transmitted, e.g., from the other arrangement 310 or 410. The conductor pair 11 is here shown to extend indefinitely, and can support many additional transceiver arrangements in addition to those shown. The transceiver arrangement 310 of this embodiment has a thermal sensor 317 coupled to its microprocessor 316, and the transceiver arrangement 410 has an actuator 418 coupled to its microprocessor 416.

In order to facilitate connection and installation of the transceiver arrangements 310 and 410 at remote locations, each of these arrangements includes a diode bridge 330 and 430, respectively, to connect its respective positive and negative leads to the positive and negative conductors 12 and 13. The diode bridges 330, 430 permit the conductors 12 and 13 to be connected to either side, and avoid any possible problem that could arise from crossing the polarities of the conductors 12, 13.

While the invention has been herein described with reference to selected preferred embodiments, it should be recognized that the invention is not limited to those embodiments. Rather, many modifications and variations will present themselves to persons skilled in the art without departure from the scope and spirit of the invention, as defined in the appended claims.

We claim:

1. A dc signaling transceiver for communicating over a single pair of conductors which carry a dc communications voltage at a level $V_{comm}$; comprising (a) microprocessor means having a signal input terminal $V_{in}$, a signal output terminal $V_{out}$, a sensor input circuit coupled to a sensor transducer, and a control output circuit coupled to control an external device;

(b) voltage limiting means having an input coupled to said pair of conductors to receive said dc communications voltage level $V_{comm}$ and an output coupled to said microprocessor means to supply thereto a supply voltage $V_{dd}$ at a predetermined level less than said communications voltage level $V_{comm}$; and (c) signal input/output means coupled to said pair of conductors and to said microprocessor means signal input terminal and signal output terminal, including means for applying incoming pulse signals from said conductors to said input terminal, and means for applying onto said conductors output pulse signals that have high and low values at said dc communications voltage level $V_{comm}$ and a predetermined voltage level $V_{Z2}$ that is between said communications voltage $V_{comm}$ and said supply voltage $V_{dd}$.

2. A dc signaling transceiver according to claim 1 wherein said signal input/output means includes voltage drop means having a voltage drop establishing said voltage level $V_{Z2}$ and controlled switching means coupled in series between said pair of conductors, with a junction of said voltage drop means and said controlled switching means being coupled to said microprocessor means signal input terminal $V_{in}$, and with a control terminal of said controlled switching means coupled to said microprocessor means signal output terminal $V_{out}$.

3. A dc signaling transceiver according to claim 2 wherein said voltage drop means includes a zener diode having a zener voltage at said voltage level $V_{Z2}$.

4. A dc signaling transceiver according to claim 2 wherein said controlled switching means includes a transistor device having a first current-carrying electrode coupled to said junction, a second current-carrying electrode coupled to one of said conductors, and a control electrode coupled to said microprocessor means signal output terminal.

5. A dc signaling transceiver according to claim 4 further comprising a resistor coupled in parallel with said transistor device between said junction and said conductor.

6. A dc signaling transmitter for communicating over a single pair of conductors which carry a dc communications voltage at a level $V_{comm}$; comprising (a) microprocessor means having a signal input terminal $V_{in}$, a signal output terminal $V_{out}$, and a sensor input circuit coupled to a sensor transducer;

(b) voltage limiting means having an input coupled to said pair of conductors to receive said dc communications voltage level $V_{comm}$ and an output coupled to said microprocessor means to supply thereto a supply voltage $V_{dd}$ at a predetermined level less than said communications voltage level $V_{comm}$; and (c) signal output means coupled to said pair of conductors and to said microprocessor means signal input terminal and signal output terminal, including means for applying incoming pulse signals from said conductors to said input terminal, and means for applying onto said conductors output pulse signals that have high and low values at said dc communications voltage level $V_{comm}$ and a predetermined voltage level $V_{Z2}$ that is between said communications voltage $V_{comm}$ and said supply voltage $V_{dd}$.

7. A dc signaling transmitter according to claim 6 wherein said signal output means includes voltage drop means having a voltage drop establishing said voltage level $V_{Z2}$ and controlled switching means coupled in series between said pair of conductors, with a junction of said voltage drop means and said controlled switching means being coupled to said microprocessor means signal input terminal $V_{in}$, and with a control terminal of said controlled switching means coupled to said microprocessor means signal output terminal $V_{out}$.

8. A dc signaling transmitter according to claim 7 wherein said voltage drop means includes a zener diode having a zener voltage at said voltage level $V_{Z2}$.

9. A dc signaling transmitter according to claim 7 wherein said controlled switching means includes a transistor device having a first current-carrying electrode coupled to said junction, a second current-carrying electrode coupled to one of said conductors, and a control electrode coupled to said microprocessor means signal output terminal.

10. A dc signaling transmitter according to claim 9 further comprising a resistor coupled in parallel with said transistor device between said junction and said conductor.

11. A dc signaling receiver for receiving communications signaling over a single pair of conductors which carry a dc communications voltage at a level $V_{comm}$; comprising (a) microprocessor means having a signal input terminal $V_{in}$, a signal output terminal $V_{out}$, and a control output circuit coupled to control an external device;

(b) voltage limiting means having an input coupled to said pair of conductors to receive said dc communications voltage level $V_{comm}$ and an output coupled to said microprocessor means to supply thereto a supply voltage $V_{dd}$ at a predetermined level less than said communications voltage level $V_{comm}$; and (c) signal input means coupled to said pair of conductors and to said microprocessor means signal input terminal and signal output terminal, including means for applying incoming pulse signals from said conductors to said input terminal, which output pulse signals have high and low values at said dc communications voltage level $V_{comm}$ and a predetermined voltage level $V_{Z2}$ that is between said communications voltage $V_{comm}$ and said supply voltage $V_{dd}$.

12. A dc signaling receiver according to claim 11 wherein said signal input means includes voltage drop means having a voltage drop establishing said voltage level $V_{Z2}$ and controlled switching means coupled in series between said pair of conductors, with a junction of said voltage drop means and said controlled switching means being coupled to said microprocessor means signal input terminal $V_{in}$, and with a control terminal of said controlled switching means coupled to said microprocessor means signal output terminal $V_{out}$.

13. A dc signaling receiver according to claim 12 wherein said voltage drop means includes a zener diode having a zener voltage at said voltage level $V_{Z2}$.

14. A dc signaling receiver according to claim 12 wherein said controlled switching means includes a transistor device having a first current-carrying electrode coupled to said junction, a second current-carrying electrode coupled to one of said conductors, and a control electrode coupled to said microprocessor means signal output terminal.

15. A dc signaling receiver according to claim 14 further comprising a resistor coupled in parallel with said transistor device between said junction and said conductor.

16. A two-wire coupled control system in which a one or more remote transceivers communicate with a main transceiver over a single pair of conductors which carry a dc communications voltage at a level $V_{comm}$;

wherein said main transceiver comprises (a) microprocessor means having a signal input terminal $V_{in}$, a signal output terminal $V_{out}$, a sensor input circuit coupled to a sensor transducer, and a control output circuit coupled to control an external device; (b) voltage limiting means having an input coupled to said pair of conductors to receive said dc communications voltage level $V_{comm}$ and an output coupled to said microprocessor means to supply thereto a supply voltage $V_{dd}$ at a predetermined level less than said communications voltage level $V_{comm}$; and (c) signal input/output means coupled to said pair of conductors and to said microprocessor means signal input terminal and signal output terminal, including means for applying incoming pulse signals from said conductors to said input terminal, and means for applying onto said conductors output pulse signals that have high and low values at said dc communications voltage level $V_{comm}$ and a predetermined voltage level $V_{Z2}$ that is between said communications voltage $V_{comm}$ and said supply voltage $V_{dd}$; and at least one of said remote transceivers also comprises (d) microprocessor means having a signal input terminal $V_{in}$, a signal output terminal $V_{out}$, and a sensor input circuit coupled to a sensor transducer; (e) voltage limiting means having an input coupled to said pair of conductors to receive said dc communications voltage level $V_{comm}$ and an output coupled to said microprocessor means to supply thereto a supply voltage $V_{dd}$ at a predetermined level less than said communications voltage level $V_{comm}$; and (f) signal input/output means coupled to said pair of conductors and to said microprocessor means signal input terminal and signal output terminal, including means for applying incoming pulse signals from said conductors to said input terminal, and means for applying onto said conductors output pulse signals that have high and low values at said dc communications voltage level $V_{comm}$ and a predetermined voltage level $V_{Z2}$ that is between said communications voltage $V_{comm}$ and said supply voltage $V_{dd}$.

17. A two-wire coupled control system according to claim 16, wherein said communications voltage $V_{comm}$ is provided from a dc supply means which includes a thermostat transformer having a primary coupled to household ac power and a secondary providing low voltage ac power, and rectifier means coupled to said secondary.

* * * * *

UNITED STATES PATENT AND TRADEMARK OFFICE
CERTIFICATE OF CORRECTION

PATENT NO. : 5,694,109
DATED : December 2, 1997
INVENTOR(S) : Nguyen, et al

It is certified that error appears in the above-identified patent and that said Letters Patent is hereby corrected as shown below:

Column 1, line 41 - Please change "omen" to read --often--.

Signed and Sealed this

Third Day of February, 1998

BRUCE LEHMAN

Attest:

Attesting Officer

Commissioner of Patents and Trademarks